(12) United States Patent
Yang et al.

(10) Patent No.: US 8,693,136 B2
(45) Date of Patent: Apr. 8, 2014

(54) MANAGEMENT MODULE, STORAGE SYSTEM, AND METHOD OF TEMPERATURE AND VIBRATION MANAGEMENT THEREOF

(71) Applicant: Wistron Corporation, New Taipei (TW)

(72) Inventors: Yao-Hao Yang, New Taipei (TW); Chih-Hung Chen, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 0 days.

(21) Appl. No.: 13/726,599

(22) Filed: Dec. 25, 2012

(65) Prior Publication Data

US 2013/0258521 A1    Oct. 3, 2013

(30) Foreign Application Priority Data

Mar. 27, 2012   (TW) .............................. 101110550 A

(51) Int. Cl.
*G11B 33/08*        (2006.01)
(52) U.S. Cl.
USPC ...................................... 360/97.19

(58) Field of Classification Search
CPC .... G11B 33/08; G11B 25/043; G11B 11/144; G11B 33/121
USPC .................... 360/69, 71, 97.12, 97.19, 73.03; 711/111, 112, 113, 114
See application file for complete search history.

(56) References Cited

U.S. PATENT DOCUMENTS 7,761,244 B2 *   7/2010   Gross et al. ..................... 702/34

* cited by examiner

*Primary Examiner* — Nabil Hindi
(74) *Attorney, Agent, or Firm* — Winston Hsu; Scott Margo

(57) ABSTRACT

The present invention discloses a management module for a storage system. The storage system comprises a plurality of hard disk drives and a plurality of fans. The management module comprises a reading unit, for obtaining a plurality of hard disk drive temperature information and a plurality of hard disk drive vibration information of the plurality of hard disk drives, and a controller, coupled to the reading unit, for adjusting rotational speeds of the plurality of fans according to the plurality of hard disk drive temperature information, the plurality of hard disk drive vibration information, and a plurality of fan vibration information of the plurality of fans.

22 Claims, 5 Drawing Sheets

MANAGEMENT MODULE, STORAGE SYSTEM, AND METHOD OF TEMPERATURE AND VIBRATION MANAGEMENT THEREOF

BACKGROUND OF THE INVENTION

1. Field of the Invention

The present invention relates to a management module, a storage system and a method of temperature and vibration management thereof, and more particularly, to a management module, a storage system and a method of temperature and vibration management thereof capable of considering both vibration and temperature information, to adjust rotational speeds and performance of the storage system.

2. Description of the Prior Art

In a modern society with information technology, a computer system has become one of the tools necessary for most people. While an operating speed of the computer system becomes faster and faster, the system dissipates more and more thermal energy. Therefore, the requirement for thermal management becomes more important.

In general, a storage system comprises a plurality of hard disk drives and a plurality of fans for dissipating heat for the hard disk drives, and a baseboard management controller (BMC) in the storage system receives approximate temperature information of the plurality of hard disk drives with a temperature sensing device set near a baseboard of the plurality of hard disk drives, so as to adjust rotational speeds of the plurality of fans, to prevent the storage system from overheating.

However, with a burst growth of information on the Internet, there are more and more data required to be stored in a storage system, and thus the storage system includes more and more hard disk drives and fans. For example, a storage system in a server may include 48~52 hard disk drives. In such a condition, rotational vibration caused by the hard disk drives and the fans may cause the storage system unstable. Therefore, performance of the storage system will be reduced, wherein the fans lack for a vibration prevention design as that in the hard disk drives, hence vibration and resonance caused by the fans rotation is more serious.

As narrated above, in the prior art, the temperature sensing device set near the baseboard of the plurality of hard disk drives can only receive approximate temperature information of the plurality of hard disk drives, and can not acquire accurate and timely temperature information. Besides, in the prior art, the method of suppressing rotational vibration of the fans is to add a mechanical design such as an anti-vibration pad, a rubber pad, etc., which only provides limited improvement. Moreover, for adjusting rotational speeds of the fans, the prior art only considers approximate temperature information of the hard disk drives, but not vibration of the hard disk drives and vibration of the fans, and thus can not optimize rotational speeds of the fans and performance of the storage system. Therefore, there is a need for improvement of the prior art.

SUMMARY OF THE INVENTION

It is therefore an objective of the present invention to provide a management module and a storage system capable of considering vibration and temperature information simultaneously, to adjust rotational speeds and performance of the storage system, and a method of temperature and vibration management thereof.

The present invention discloses a management module for a storage system which comprises a plurality of hard disk drives and a plurality of fans. The management module comprises a reading unit for obtaining a plurality of hard disk drive temperature information and a plurality of hard disk drive vibration information of the plurality of hard disk drives, and a controller coupled to the reading unit for adjusting rotational speeds of the plurality of fans according to the plurality of hard disk drive temperature information, the plurality of hard disk drive vibration information, and a plurality of fan vibration information of the plurality of fans.

The present invention further discloses a storage system which comprises a plurality of hard disk drives, a plurality of fans, and at least one management module. The at least one management module is used for the storage system. Each management module comprises a reading unit for obtaining a plurality of hard disk drive temperature information and a plurality of hard disk drive vibration information of the plurality of hard disks, and a controller coupled to the reading unit, for adjusting rotational speeds of the plurality of fans according to the plurality of hard disk drive temperature information, the plurality of hard disk drive vibration information, and a plurality of fan vibration information of the plurality of fans.

The present invention further discloses a method of temperature and vibration management for a storage system which comprises a plurality of hard disk drives and a plurality of fans. The method of temperature and vibration management comprises obtaining a plurality of hard disk drive temperature information and a plurality of hard disk drive vibration information of the plurality of hard disk drives, and adjusting rotational speeds of the plurality of fans according to the plurality of hard disk drive temperature information, the plurality of hard disk drive vibration information, and a plurality of fan vibration information of the plurality of fans.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
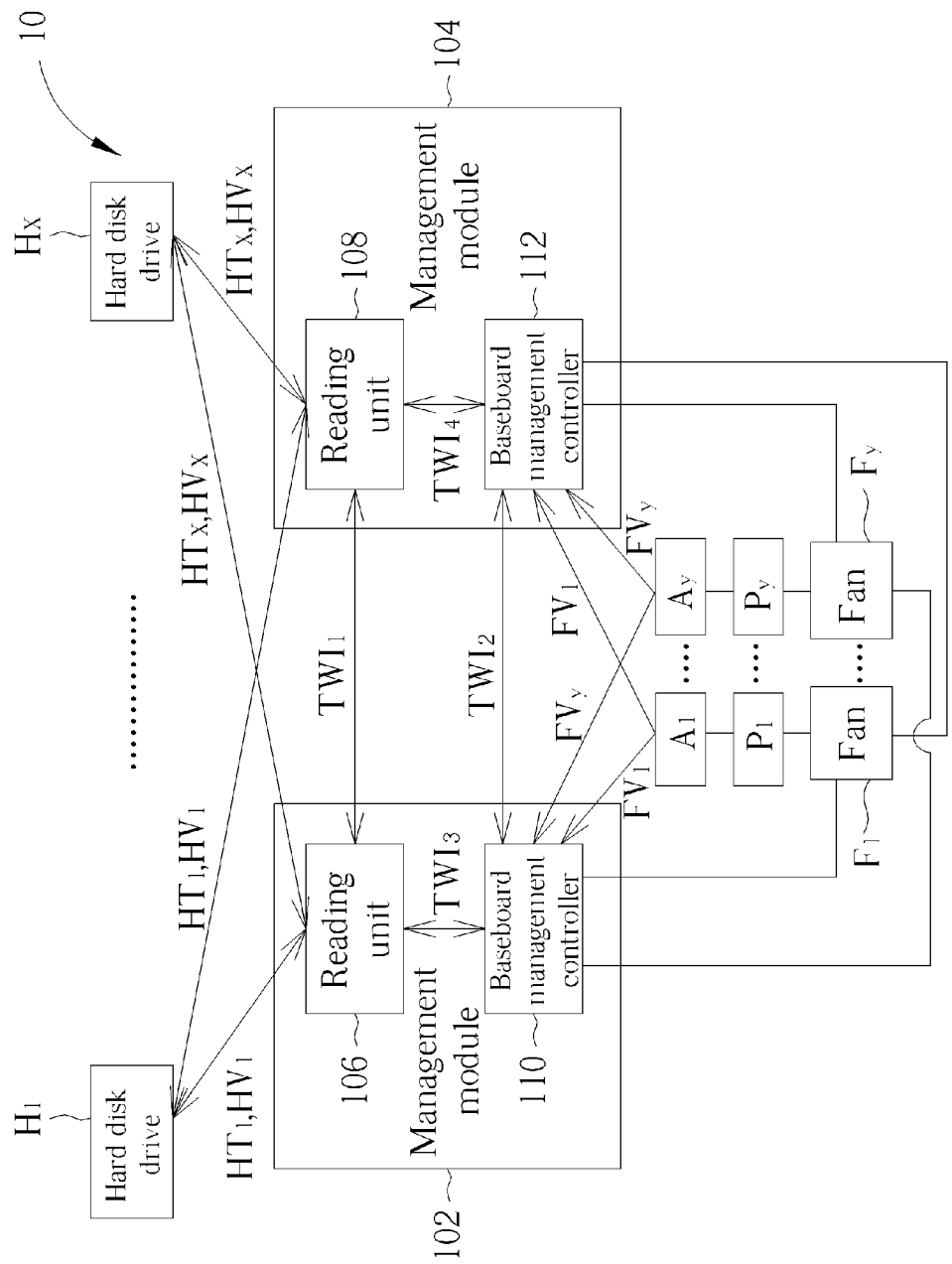
FIG. 1A is a schematic diagram of a storage system 10 according to an embodiment of the present invention.

Please refer to FIG. 1A. FIG. 1A is a schematic diagram of a storage system 10 according to an embodiment of the present invention. As shown in FIG. 1A, the storage system 10 includes hard disk drives $H_1 \sim H_x$, fans $F_1 \sim F_y$, and management modules 102 and 104, wherein the hard disk drives $H_1 \sim H_x$ are all coupled to the management modules 102 and 104, the fans $F_1 \sim F_y$ are all coupled to the management modules 102 and 104, and the management modules 102 and 104 are coupled to each other. The management modules 102 and 104 include reading units 106 and 108 respectively, and one controller for each management module, wherein the two controllers can be micro controls, and preferably, be baseboard management controllers (BMC) 110 and 112. The reading unit 106 is coupled to the reading unit 108 through a two wire interface $TWI_1$, the BMC 110 is coupled to the BMC 112 through a two wire interface $TWI_2$, the BMC 110 is coupled to the reading unit 106 through a two wire interface $TWI_3$, and the BMC 112 is coupled to the reading unit 108 through a two wire interface $TWI_4$.

In short, the management modules 102 and 104 cooperate to adjust rotational speeds of the fans $F_1 \sim F_y$, so as to optimize performance of the storage system 10, e.g. the management modules 102 and 104 accelerate rotational speeds of the fans $F_1 \sim F_y$ to maintain normal operation of the storage system 10 when temperature of the hard disk drives $H_1 \sim H_x$ is too high, while the management modules 102 and 104 reduce rotational speeds of the fans $F_1 \sim F_y$ to improve performance of the storage system 10 when vibration of the hard disk drives $H_1 \sim H_x$ and vibration of the fans $F_1 \sim F_y$ are too high. For example, the management modules 102 and 104 can inform each other which fans among the fans $F_1 \sim F_y$ is controlled by itself, such that the other management module can control other fans among the fans $F_1 \sim F_y$. In such a condition, when one of the management modules fails, the other management module can support the failed management module to keep on optimizing performance of the storage system 10, e.g. when the management module 102 fails, the management module 104 can support the operation of the management module 102 by taking operations of the management module 102. Therefore, the storage system 10 can still operate normally when one of the management modules 102 and 104 fails.

Figure 1B:
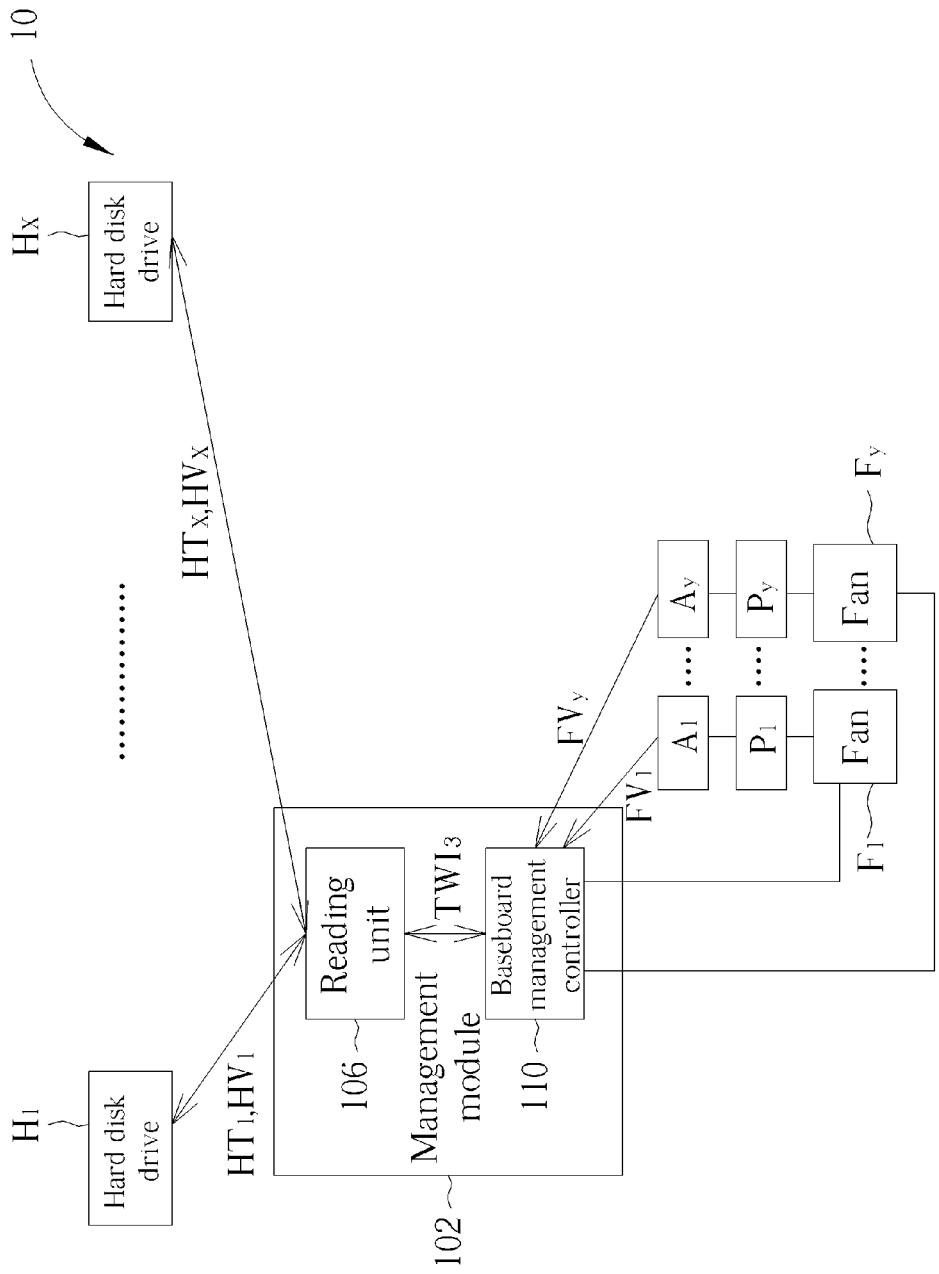
FIG. 1B is a schematic diagram of another storage system 10 according to an embodiment of the present invention.

Noticeably, since each of the management modules 102 and 104 includes a set of a reading unit and a BMC, even if the storage system 10 includes only one management module among the management modules 102 and 104, i.e. without a subsidiary management module, the storage system 10 can still adjust rotational speeds of the fans $F_1 \sim F_y$ to optimize performance of the storage system 10. Please refer to FIG. 1B. FIG. 1B is a schematic diagram of the storage system 10 optimizing performance of the storage system 10 only with the management module 102 according to an embodiment of the present invention. As shown in FIG. 1B, since the management module 102 can optimize performance of the storage system 10 by itself, following description illustrates a case that the performance of the storage system 10 is optimized only by the management module 102. In the management module 102, the reading unit 106 can obtain hard disk drive temperature information $HT_1 \sim HT_x$ and hard disk drive vibration information $HV_1 \sim HV_x$ of the hard disk drives $H_1 \sim H_x$ for the BMC 110, and hence the BMC 110 can adjust rotational speeds of the fans $F_1 \sim F_y$ according to the hard disk drive temperature information $HT_1 \sim HT_x$, the hard disk drive vibration information $HV_1 \sim HV_x$ and fan vibration information $FV_1 \sim FV_y$ of the fans $F_1 \sim F_y$. In such a condition, the BMC 110 considers the hard disk drive temperature information $HT_1 \sim HT_x$, and also considers the hard disk drive vibration information $HV_1 \sim HV_x$ and the fan vibration information $FV_1 \sim FV_y$ when controlling rotational speeds of the fans $F_1 \sim F_y$. Therefore, other than preventing the storage system 10 from overheating, the management module 102 can also avoid rotational vibration of the fans $F_1 \sim F_y$ causing the storage system 10 unstable, which reduces performance of the storage system 10. As a result, the BMC 110 can consider both vibration and temperature information, to adjust rotational speeds of the fans $F_1 \sim F_y$ so as to optimize performance of the storage system 10.

In an embodiment of the present invention, the reading unit 106 utilizes Self-Monitoring, Analysis, and Reporting Technology (SMART) commands to monitor the hard disk drives $H_1 \sim H_x$, so as to obtain the hard disk drive temperature information $HT_1 \sim HT_x$ and the hard disk drive vibration information $HV_1 \sim HV_x$. The SMART is a conventional tool capable of monitoring and analyzing status of hard disk drives, and thus the reading unit 106 can receive the hard disk drive temperature information $HT_1 \sim HT_x$ and the hard disk drive vibration information $HV_1 \sim HV_x$ accurately from the hard disk drives $H_1 \sim H_x$ with the related commands. The SMART is well-known to those skilled in the art, and will not be narrated hereinafter. Then, the reading unit 106 can transmit the hard disk drive temperature information $HT_1 \sim HT_x$ and the hard disk drive vibration information $HV_1 \sim HV_x$ to the BMC 110 through the two wire interface $TWI_3$ coupled to the BMC 110. As a result, instead of receiving approximate temperature information with a temperature sensing device set near a baseboard of the hard disk drives in the prior art, the present invention can utilize SMART to acquire the accurate hard disk drive temperature information $HT_1 \sim HT_x$ as well as the hard disk drive vibration information $HV_1 \sim HV_x$.

Figure 2:
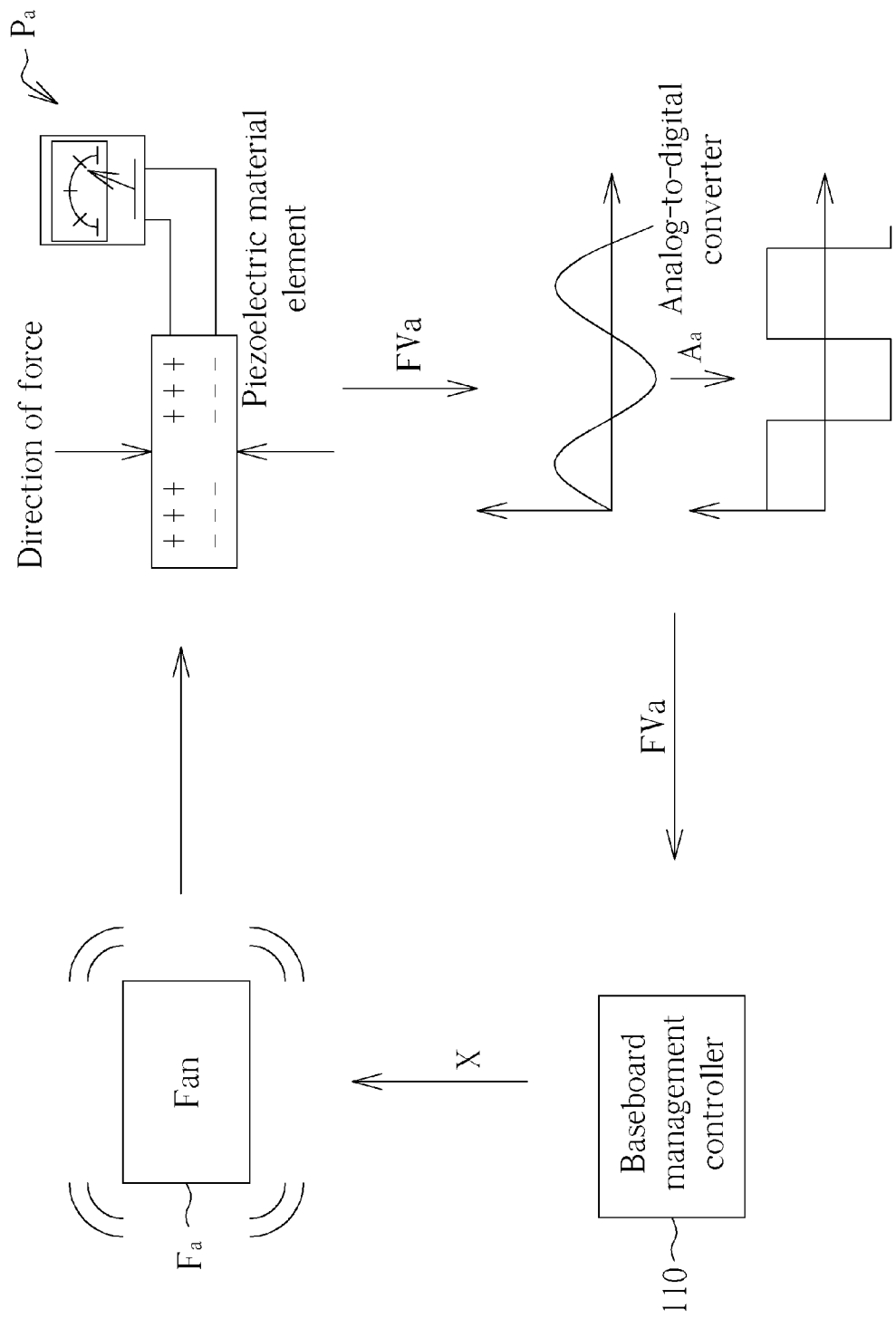
FIG. 2 is a schematic diagram of receiving fan vibration information of a fan.

On the other hand, piezoelectric material elements $P_1 \sim P_y$ and analog-to-digital converters $A_1 \sim A_y$ can be coupled between the BMC 110 and the fans $F_1 \sim F_y$, so as to receive the fan vibration information $FV_1 \sim FV_y$ for the BMC 110. For example, please refer to FIG. 2. FIG. 2 is a schematic diagram of receiving fan vibration information $FV_a$ of a fan $F_a$, wherein the fan $F_a$ is one of the fans $F_1 \sim F_y$. As shown in FIG. 2, when the fan $F_a$ starts rotating and thus generates vibration, as shown in upper left part of FIG. 2, a corresponding piezoelectric material element $P_a$ is set near the fan $F_a$. When the fan $F_a$ vibrates, the piezoelectric material element $P_a$ may sense an external force generated by the vibration and thus an electric dipole moment of the material body may be changed due to compression, and the piezoelectric material will generate equal amount of electric charge on its interface to resist the change, so as to generate electric energy. In short, mechanic vibration of the fan $F_a$ is transformed into corresponding electric energy, to generate the fan vibration information $FV_a$, as shown in upper right part of FIG. 2. Then, a corresponding analog-to-digital converter $A_a$ converts the generated electric energy of the fan vibration information $FV_a$ in an analog form into a digital form, as shown in lower right part of FIG. 2, and then transmits the fan vibration information $FV_a$ to the BMC 110. By the same token, similar methods can be utilized to obtain the fan vibration information of other fans among the fans $F_1 \sim F_y$. Finally, the BMC 110 can generate a fan rotational speed control signal X, as shown in lower left part of FIG. 2, according to the fan vibration information $FV_1 \sim FV_y$ together with the hard disk drive temperature information $HT_1 \sim HT_x$ and the hard disk drive vibration information $HV_1 \sim HV_x$ mentioned above, to control rotational speed of the fan $F_a$, as shown in upper left part of FIG. 2. As a result, by executing the above steps repeatedly in a unit time, the present invention can detect the fan vibration information $FV_1 \sim FV_y$ continuously with the piezoelectric material element $P_1 \sim P_y$, and then adjust rotational speeds of the fans $F_1 \sim F_y$ accordingly.

Figure 3:
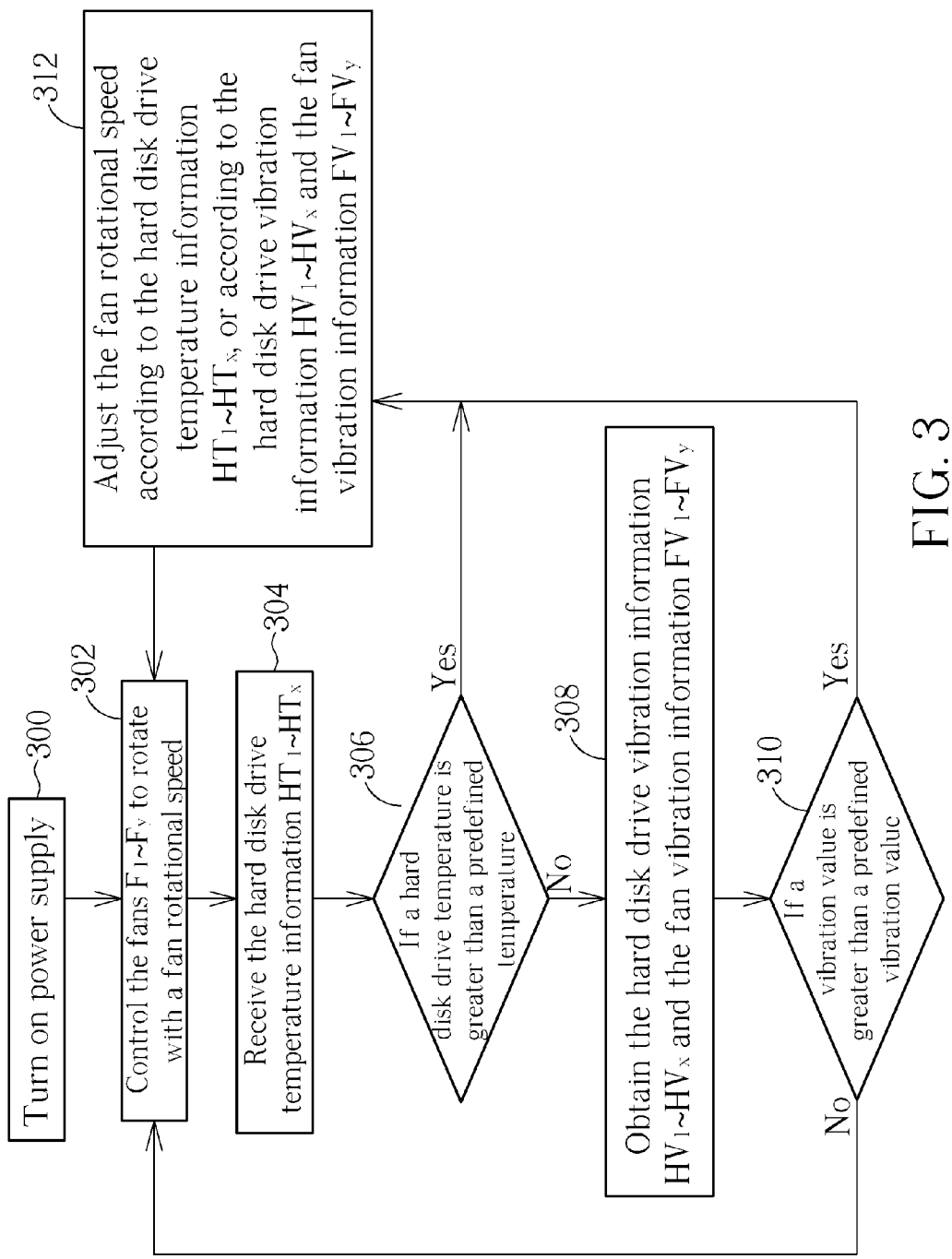
FIG. 3 is a schematic diagram of a process of temperature and vibration management according to an embodiment of the present invention.

By utilizing the above method, the BMC 110 can obtain the hard disk drive temperature information $HT_1 \sim HT_x$, the hard disk drive vibration information $HV_1 \sim HV_x$ and the fan vibration information $FV_1 \sim FV_y$. The related operation of adjusting rotational speeds of the fans $F_1 \sim F_y$ can be referred to FIG. 3. FIG. 3 is a schematic diagram of a process of temperature and vibration management according to an embodiment of the present invention. The process includes following steps:

Step 300: Turn on power supply.

Step 302: Control the fans $F_1 \sim F_y$ to rotate with a fan rotational speed.

Step 304: Receive the hard disk drive temperature information $HT_1 \sim HT_x$.

Step 306: Determine if a hard disk drive temperature corresponding to the hard disk drive temperature information $HT_1 \sim HT_x$ is greater than a predefined temperature. If yes, go to Step 312; otherwise, go to Step 308.

Step 308: Obtain the hard disk drive vibration information $HV_1 \sim HV_x$ and the fan vibration information $FV_1 \sim FV_y$.

Step 310: Determine if a hard disk drive vibration value or a fan vibration value corresponding to the hard disk drive vibration information $HV_1 \sim HV_x$ or the fan vibration information $FV_1 \sim FV_y$ is greater than a predefined vibration value. If yes, go to Step 312; otherwise, go to Step 302.

Step 312: Adjust the fan rotational speed according to the hard disk drive temperature information $HT_1 \sim HT_x$, or according to the hard disk drive vibration information $HV_1 \sim HV_x$ and the fan vibration information $FV_1 \sim FV_y$. Then go to Step 302.

According to the above process of temperature and vibration management, when power supply of the storage system 10 is turned on, (Step 300), the BMC 110 may control the fans $F_1 \sim F_y$ to rotate with a fan rotational speed first (Step 302). At this moment time, the fan rotational speed is a predefined fan rotational speed, and values of every fan rotational speeds are the same, i.e. the storage system 10 is supposed to operate normally with the predefined fan rotational speed. Then, after receiving the hard disk drive temperature information $HT_1 \sim HT_x$ (Step 304), the BMC 110 may determine if a hard disk drive temperature corresponding to the hard disk drive temperature information $HT_1 \sim HT_x$ is greater than a predefined temperature first (Step 306). For example, the predefined temperature approximately ranges from 50 to 60 degrees Celsius, i.e. an upper limit of temperature in which the storage system 10 can operate normally, or an upper limit of temperature in which the hard disk drives $H_1 \sim H_x$ can operate normally. In such a situation, if a hard disk drive temperature is greater than the predefined temperature, the BMC 110 will adjust the fan rotational speed of each fan according to the hard disk drive temperature information $HT_1 \sim HT_x$ as in Step 312, i.e. accelerate the fan rotational speed to reduce the hard disk drive temperature, wherein the fan rotational speed can be obtained from a specification table of rotational speed versus temperature. Then the BMC 110 controls the fans $F_1 \sim F_y$ to rotate with the adjusted fan rotational speeds as in Step 302.

On the other hand, if a hard disk drive temperature is less than the predefined temperature, the BMC 110 further obtains the hard disk drive vibration information $HV_1 \sim HV_x$ and the fan vibration information $FV_1 \sim FV_y$ (Step 308), and then the BMC 110 determines if a hard disk drive vibration value or a fan vibration value corresponding to the hard disk drive vibration information $HV_1 \sim HV_x$ or the fan vibration information $FV_1 \sim FV_y$ is greater than a predefined vibration value. The predefined vibration value is an upper limit of vibration in which performance of the storage system 10 may not be reduced too much due to rotational vibration. If a hard disk drive vibration or a fan vibration is greater than the predefined vibration value, the BMC 110 will adjust the fan rotational speed according to the hard disk drive vibration information $HV_1 \sim HV_x$ and the fan vibration information $FV_1 \sim FV_y$, i.e. reduce the fan rotational speed to improve performance of the storage system 10, and then control the fans $F_1 \sim F_y$ to rotate with the adjusted fan rotational speeds (Step 310, 312, and 302). On the contrary, if hard disk drive vibration and fan vibration corresponding to the hard disk drive vibration information $HV_1 \sim HV_x$ and the fan vibration information $FV_1 \sim FV_y$ are both less than the predefined vibration value, the BMC 110 may not adjust the fan rotational speed, and still control the fans $F_1 \sim F_y$ to rotate with the original fan rotational speed.

Besides, since the BMC 110 accelerates the fan rotational speed when a hard disk drive temperature is greater than the predefined temperature, while the BMC 110 reduces the fan rotational speed when a hard disk drive vibration or a fan vibration is greater than the predefined vibration value, the operation of accelerating the fan rotational speed to avoid overheating may cause too much rotational vibration, and thus the fan rotational speed should be reduced, and then the operation of reducing the fan rotational speed may cause overheating and the fan rotational speed should be accelerated. Therefore, a balance between temperature and vibration may not be achieved, and the BMC 110 may adjust the fan rotational speed repeatedly.

Figure 4:
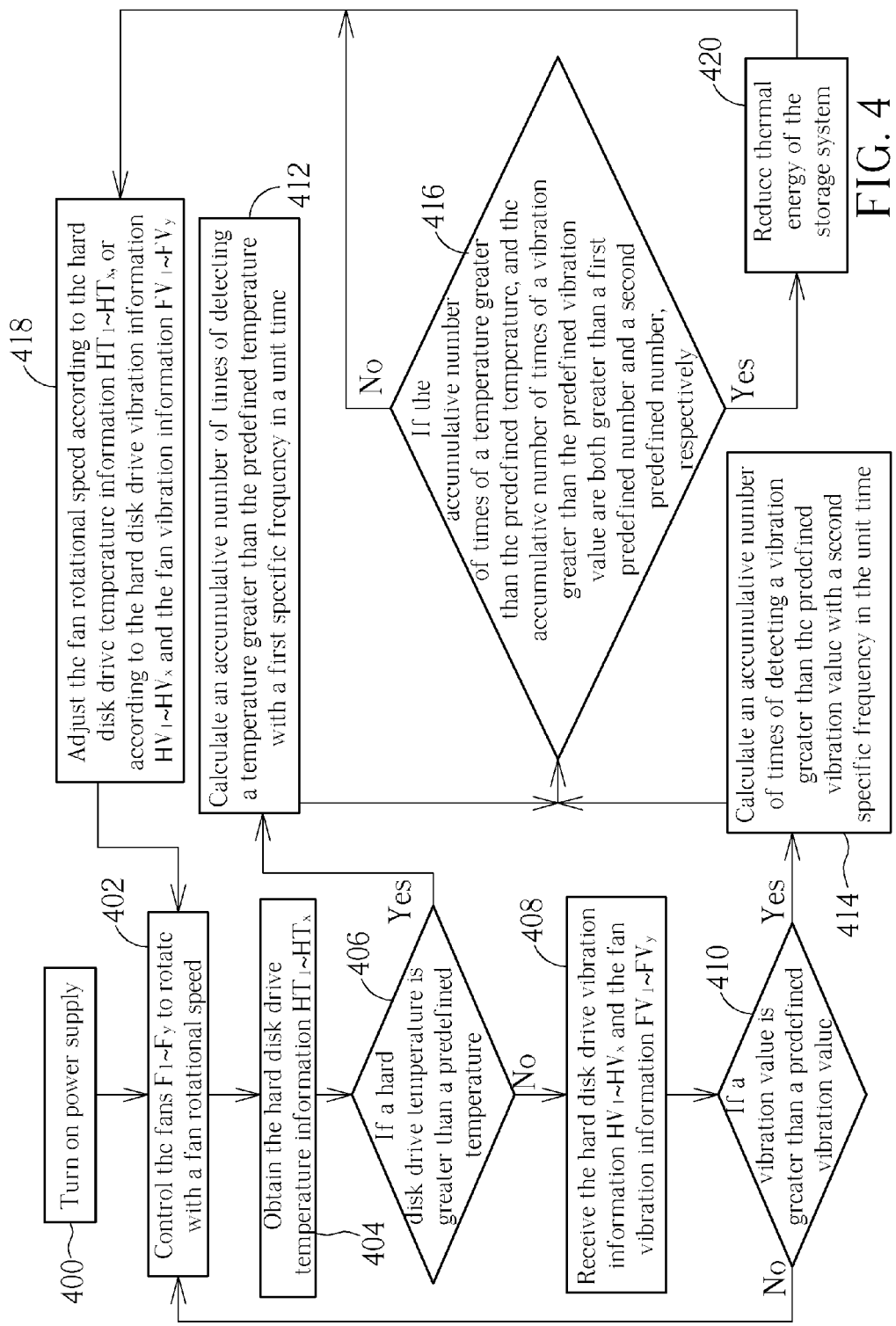
FIG. 4 is a schematic diagram of another process of temperature and vibration management according to an embodiment of the present invention.

In such a condition, please refer to FIG. 4. FIG. 4 is a schematic diagram of another process of temperature and vibration management according to an embodiment of the present invention. The process includes following steps:

Step 400: Turn on power supply.

Step 402: Control the fans $F_1 \sim F_y$ to rotate with a fan rotational speed.

Step 404: Obtain the hard disk drive temperature information $HT_1 \sim HT_x$.

Step 406: Determine if a hard disk drive temperature corresponding to the hard disk drive temperature information $HT_1 \sim HT_x$ is greater than a predefined temperature. If yes, go to Step 412; otherwise, go to Step 408.

Step 408: Receive the hard disk drive vibration information $HV_1 \sim HV_x$ and the fan vibration information $FV_1 \sim FV_y$.

Step 410: Determine if a hard disk drive vibration value or a fan vibration value corresponding to the hard disk drive vibration information $HV_1 \sim HV_x$ or the fan vibration information $FV_1 \sim FV_y$ is greater than a predefined vibration value. If yes, go to Step 414; otherwise, go to Step 402.

Step 412: Calculate an accumulative number of times of detecting a hard disk drive temperature greater than the predefined temperature with a first specific frequency in a unit time.

Step 414: Calculate an accumulative number of times of detecting a hard disk drive vibration or a fan vibration greater than the predefined vibration value with a second specific frequency in the unit time.

Step 416: Determine if the accumulative number of times of a hard disk drive temperature greater than the predefined temperature, and the accumulative number of times of a hard disk drive vibration or a fan vibration greater than the predefined vibration value are both greater than a first predefined number and a second predefined number respectively. If yes, go to Step 420; otherwise, go to Step 418.

Step 418: Adjust the fan rotational speed according to the hard disk drive temperature information $HT_1 \sim HT_x$, or according to the hard disk drive vibration information $HV_1 \sim HV_x$ and the fan vibration information $FV_1 \sim FV_y$. Then go to Step 402.

Step 420: Reduce thermal energy of the storage system 10.

Steps 400~410 and 418 shown in FIG. 4 are similar to Steps 300~312 shown in FIG. 3, and can be derived by referring to the above description. The main difference between the process of temperature and vibration management shown in FIG. 4 and the process of temperature and vibration management shown in FIG. 3 is that Steps 412~416 and 420 are added in the process of temperature and vibration management shown in FIG. 4, to avoid repeated adjustment. According to the process of temperature and vibration management shown in FIG. 4, when detecting a hard disk drive temperature greater than the predefined temperature with a first specific frequency, i.e. the frequency of executing Step 402~406, the BMC 110 calculates an accumulative number of times of a hard disk drive temperature greater than the predefined temperature in a unit time first (Step 412), and when detecting a hard disk drive vibration or a fan vibration greater than the predefined vibration value with a second specific frequency, i.e. the frequency of executing Step 408~410, the BMC 110 also calculates an accumulative number of times of a hard disk drive vibration or a fan vibration greater than the predefined vibration value in a unit time (Step 414). Then the BMC 110 determines if the accumulative number of times of a hard disk drive temperature greater than the predefined temperature in a unit time, and the accumulative number of times of a hard disk drive vibration or a fan vibration greater than the predefined vibration value in the unit time are both greater than a first predefined number and a second predefined number respectively, as in Step 416, (e.g. execute Step 402~406 to detect temperature or execute Step 408~410 to detect vibration once every several seconds or every several mini-seconds, and an accumulative number of times of a hard disk drive temperature greater than the predefined temperature reaches a first predefined number of 8 in the unit time, and an accumulative number of times of a hard disk drive vibration or a fan vibration greater than the predefined vibration value also reaches a second predefined number of 10 in the unit time.) and thus the fan rotational speed is increased and reduced frequently and repeatedly in the unit time. If the accumulative number of times of a hard disk drive temperature greater than the predefined temperature in a unit time, and the accumulative number of times of a hard disk drive vibration or a fan vibration greater than the predefined vibration value in the unit time are both greater than a first predefined number and a second predefined number, the storage system 10 will reduce thermal energy (Step 420). For example, the storage system 10 can reduce speeds of the hard disk drives $H_1$~$H_x$ or turn some of the hard disk drives $H_1$~$H_x$ off, reduce speed of CPU, reduce speed of memory, turn off unnecessary functions, etc. After whole system thermal energy of the storage system 10 is reduced, the BMC 110 adjust the fan rotational speed (Step 418). As a result, the present invention can prevent the BMC 110 from repeatedly accelerating and reducing the fan rotational speed when a balance between temperature and vibration may not be achieved.

Noticeably, the spirit of the present invention is to consider the hard disk drive temperature information $HT_1$~$HT_x$, the hard disk drive vibration information $HV_1$~$HV_x$ and the fan vibration information $FV_1$~$FV_y$, to adjust rotational speed of the fans $F_1$~$F_y$, so as to optimize performance of the storage system 10. Those skilled in the art can make modifications and alterations accordingly. For example, methods of obtaining the hard disk drive temperature information $HT_1$~$HT_x$, the hard disk drive vibration information $HV_1$~$HV_x$ and the fan vibration information $FV_1$~$FV_y$ is not limited to the abovementioned method, and other commands or detecting methods can also be utilized, as long as the obtained temperature and vibration information are accurate. Besides, since when the hard disk drive temperature is greater than the predefined temperature, the storage system 10 can not operate normally, while when the hard disk drive vibration or the fan vibration is greater than the predefined vibration value, only performance of the storage system 10 is reduced due to rotational vibration, in the above process of temperature and vibration management, the BMC 110 determines if the hard disk drive temperature is greater than the predefined temperature first, and then performs the adjustment to prevent the storage system 10 from abnormal operation. In other embodiments, the BMC 110 can also determine if the hard disk drive vibration or the fan vibration greater than the predefined vibration value first, and then perform the adjustment accordingly, i.e. execute Step 308 and 310, or Step 408 and 410 for measuring and determining vibration, and then execute Step 304 and 306, or Step 404 and 406 for measuring and determining temperature, which is not limited herein.

For adjusting rotational speeds of the fans, the prior art only considers approximate temperature information of the hard disk drives, but not vibration of the hard disk drives and vibration of the fans, and thus can not optimize rotational speeds of the fans and performance of the storage system. In comparison, the present invention can utilize SMART, which is only in one of the embodiments of the present invention, or other methods to acquire the accurate hard disk drive temperature information $HT_1$~$HT_x$ and the accurate hard disk drive vibration information $HV_1$~$HV_x$, and then detect the fan vibration information $FV_1$~$FV_y$ with the piezoelectric material element $P_1$~$P_y$, and adjust rotational speeds of the fans $F_1$~$F_y$, accordingly, so as to optimize performance of the storage system 10.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A management module for a storage system which comprises a plurality of hard disk drives and a plurality of fans, the management module comprising:
    a reading unit for obtaining a plurality of hard disk drive temperature information and a plurality of hard disk drive vibration information of the plurality of hard disk drives; and
    a controller coupled to the reading unit for adjusting rotational speeds of the plurality of fans according to the plurality of hard disk drive temperature information, the plurality of hard disk drive vibration information, and a plurality of fan vibration information of the plurality of fans.

2. The management module of claim 1, wherein the reading unit utilizes Self-Monitoring, Analysis, and Reporting Technology (SMART) commands to monitor the plurality of hard disk drives to obtain the plurality of hard disk drive temperature information and the plurality of hard disk drive vibration information.

3. The management module of claim 1, wherein the reading unit is coupled to the controller through a two wire interface to transmit the plurality of hard disk drive temperature information and the plurality of hard disk drive vibration information to the controller.

4. The management module of claim 1, wherein when a hard disk drive temperature corresponding to the plurality of hard disk drive temperature information is greater than a predefined temperature, the controller accelerates rotational speeds of the plurality of fans.

5. The management module of claim 4, wherein when a hard disk drive vibration value or a fan vibration value corresponding to the plurality of hard disk drive vibration information or the plurality of fan vibration information is greater than a predefined vibration value, the controller reduces rotational speeds of the plurality of fans.

6. The management module of claim 5, wherein when an accumulative number of times of detecting a hard disk drive temperature greater than the predefined temperature with a first specific frequency in a unit time, and an accumulative number of times of detecting a hard disk drive vibration or a fan vibration greater than the predefined vibration value with a second specific frequency in the unit time are both greater than a first predefined number and a second predefined number respectively, the storage system reduces thermal energy.

7. The management module of claim 1, wherein the controller is a baseboard management controller.

8. A storage system comprising:
   a plurality of hard disk drives;
   a plurality of fans; and
   at least one management module for the storage system, each management module comprising:
      a reading unit for obtaining a plurality of hard disk drive temperature information and a plurality of hard disk drive vibration information of the plurality of hard disks; and
      a controller coupled to the reading unit for adjusting rotational speeds of the plurality of fans according to the plurality of hard disk drive temperature information, the plurality of hard disk drive vibration information, and a plurality of fan vibration information of the plurality of fans.

9. The storage system of claim 8, wherein the reading unit utilizes Self-Monitoring, Analysis, and Reporting Technology (SMART) commands to monitor the plurality of hard disk drives to obtain the plurality of hard disk drive temperature information and the plurality of hard disk drive vibration information.

10. The storage system of claim 8, wherein the reading unit is coupled to the controller through a two wire interface to transmit the plurality of hard disk drive temperature information and the plurality of hard disk drive vibration information to the controller.

11. The storage system of claim 8, wherein the at least one management module are two management modules, wherein when one of the two management modules fails, the other management module supports operation of the one of the two management modules.

12. The storage system of claim 8, wherein when a hard disk drive temperature corresponding to the plurality of hard disk drive temperature information is greater than a predefined temperature, the controller accelerates rotational speeds of the plurality of fans.

13. The storage system of claim 12, wherein when a hard disk drive vibration value or a fan vibration value corresponding to the plurality of hard disk drive vibration information or the plurality of fan vibration information is greater than a predefined vibration value, the controller reduces rotational speeds of the plurality of fans.

14. The storage system of claim 13, wherein when an accumulative number of times of detecting a hard disk drive temperature greater than the predefined temperature with a first specific frequency in a unit time, and an accumulative number of times of detecting a hard disk drive vibration or a fan vibration greater than the predefined vibration value with a second specific frequency in the unit time are both greater than a first predefined number and a second predefined number respectively, the storage system reduces thermal energy.

15. The storage system of claim 8, wherein the controller is a baseboard management controller.

16. A method of temperature and vibration management for a storage system which comprises a plurality of hard disk drives and a plurality of fans, the method of temperature and vibration management comprising:
   obtaining a plurality of hard disk drive temperature information and a plurality of hard disk drive vibration information of the plurality of hard disk drives; and
   adjusting rotational speeds of the plurality of fans according to the plurality of hard disk drive temperature information, the plurality of hard disk drive vibration information, and a plurality of fan vibration information of the plurality of fans.

17. The method of temperature and vibration management of claim 16, wherein the step of obtaining the plurality of hard disk drive temperature information and the plurality of hard disk drive vibration information of the plurality of hard disk drives comprises:
   utilizing Self-Monitoring, Analysis, and Reporting Technology (SMART) commands to monitor the plurality of hard disk drives to obtain the plurality of hard disk drive temperature information and the plurality of hard disk drive vibration information.

18. The method of temperature and vibration management of claim 16, further comprising:
   transforming mechanical vibration of the plurality of fans to corresponding electrical energy, to generate the plurality of fan vibration information.

19. The method of temperature and vibration management of claim 16, further comprising:
   transforming the plurality of fan vibration information to digital form.

20. The method of temperature and vibration management of claim 16, wherein the step of adjusting rotational speeds of the plurality of fans according to the plurality of hard disk drive temperature information, the plurality of hard disk drive vibration information, and the plurality of fan vibration information of the plurality of fans comprises:
   when a hard disk drive temperature corresponding to the plurality of hard disk drive temperature information is greater than a predefined temperature, accelerating rotational speeds of the plurality of fans.

21. The method of temperature and vibration management of claim 16, wherein the step of adjusting rotational speeds of the plurality of fans according to the plurality of hard disk drive temperature information, the plurality of hard disk drive vibration information, and the plurality of fan vibration information of the plurality of fans comprises:
   when a hard disk drive vibration value or a fan vibration value corresponding to the plurality of hard disk drive vibration information or the plurality of fan vibration information is greater than a predefined vibration value, reducing rotational speeds of the plurality of fans.

22. The method of temperature and vibration management of claim 21, wherein the step of adjusting rotational speeds of the plurality of fans according to the plurality of hard disk drive temperature information, the plurality of hard disk drive vibration information, and the plurality of fan vibration information of the plurality of fans, to optimize performance of the storage system comprises:
   when an accumulative number of times of detecting a hard disk drive temperature greater than the predefined temperature with a first specific frequency in a unit time, and an accumulative number of times of detecting a hard disk drive vibration or a fan vibration greater than the predefined vibration value with a second specific frequency in the unit time are both greater than a first predefined number and a second predefined number respectively, reducing thermal energy of the storage system.

* * * * *